: US 10,772,290 B2
(45) Date of Patent: Sep. 15, 2020

(54) REVERSIBLE CUTTING EDGE FOR AGRICULTURAL CUTTER

(71) Applicant: MEYERS MANUFACTURING CORPORATION, Dorchester, WI (US)

(72) Inventors: Joseph Michael Repka, Holcombe, WI (US); Christopher J. Albright, Abbotsford, WI (US)

(73) Assignee: Meyer Manufacturing Corporation, Dorchester, WI (US)

( * ) Notice: Subject to any disclaimer, the term of this patent is extended or adjusted under 35 U.S.C. 154(b) by 241 days.

(21) Appl. No.: 16/030,552

(22) Filed: Jul. 9, 2018

(65) Prior Publication Data

US 2020/0009517 A1    Jan. 9, 2020

(51) Int. Cl.
*A01K 5/00* (2006.01)
*B01F 7/00* (2006.01)
*B01F 15/02* (2006.01)
*B02C 18/18* (2006.01)

(52) U.S. Cl.
CPC .............. *A01K 5/004* (2013.01); *A01K 5/001* (2013.01); *B01F 7/00416* (2013.01); *B01F 7/00616* (2013.01); *B01F 15/0235* (2013.01); *B02C 18/18* (2013.01); *B01F 2215/0008* (2013.01)

(58) Field of Classification Search
CPC .. B02C 18/18; B01F 7/00616; B01F 7/00416; B01F 7/24
USPC ............................................. 241/260.1, 605
See application file for complete search history.

(56) References Cited

U.S. PATENT DOCUMENTS

| 513,834 | A | * | 1/1894 | Smith | A01D 34/13 |
| | | | | | 56/299 |
| 3,254,687 | A | * | 6/1966 | Alexandrovich | A01F 29/00 |
| | | | | | 241/88.2 |
| 4,290,326 | A | * | 9/1981 | Ibach | A01D 34/18 |
| | | | | | 72/352 |
| 4,901,929 | A | | 2/1990 | Barclay | |
| 5,456,416 | A | * | 10/1995 | Hartwig | B01F 7/24 |
| | | | | | 241/260.1 |
| 5,823,449 | A | | 10/1998 | Kooima et al. | |
| 5,839,263 | A | | 11/1998 | Biernath et al. | |
| 5,863,122 | A | * | 1/1999 | Tamminga | A01K 5/004 |
| | | | | | 241/101.761 |
| 6,092,750 | A | | 7/2000 | Kooima et al. | |
| 6,328,465 | B1 | * | 12/2001 | Tamminga | A01K 5/004 |
| | | | | | 241/260.1 |
| 6,890,092 | B2 | * | 5/2005 | Tamminga | A01K 5/004 |
| | | | | | 241/101.761 |
| 6,929,394 | B2 | * | 8/2005 | Tamminga | A01K 5/004 |
| | | | | | 366/192 |
| 6,945,485 | B1 | * | 9/2005 | Douglas | A01K 5/004 |
| | | | | | 241/101.761 |
| 6,969,191 | B2 | * | 11/2005 | Tamminga | A01K 5/004 |
| | | | | | 241/101.761 |

(Continued)

*Primary Examiner* — Faye Francis
(74) *Attorney, Agent, or Firm* — Boyle Fredrickson, S.C.

(57) ABSTRACT

A cutting edge for agricultural use provides opposed cutting edges arranged to be rotationally symmetric about an axis so that the cutting edge may be reversed in the field to repair or replace the cutting edge without the need for separate spare parts. In some embodiments a support plate may provide a ledge stop supporting the unused cutting edge to absorb impact shocks without cutting edge damage.

7 Claims, 4 Drawing Sheets

(56) References Cited

U.S. PATENT DOCUMENTS

| | | | |
|---|---|---|---|
| 7,290,341 B2 | 11/2007 | Kooima | |
| 7,555,889 B2 * | 7/2009 | Priesnitz | A01F 12/40 56/504 |
| 8,100,578 B2 * | 1/2012 | Ramhorst | B01F 7/00133 366/320 |
| 8,109,176 B1 | 2/2012 | Kooima | |
| 8,186,611 B1 | 5/2012 | Boer et al. | |
| 8,302,893 B2 * | 11/2012 | Waznys | B02C 13/14 241/261.1 |
| 8,540,177 B2 * | 9/2013 | Baker | A01K 5/004 241/101.761 |
| 8,646,715 B2 * | 2/2014 | Pellman | B02C 18/18 241/261.1 |
| D768,727 S * | 10/2016 | Johnson | D15/17 |
| 9,751,055 B2 * | 9/2017 | Tamminga | B01F 7/24 |
| 2003/0060246 A1 * | 3/2003 | Bueermann | A01F 12/40 460/112 |
| 2003/0125098 A1 * | 7/2003 | Weichholdt | A01F 12/40 460/112 |
| 2004/0259611 A1 * | 12/2004 | Dow | A01F 12/40 460/112 |
| 2005/0016630 A1 * | 1/2005 | Priesnitz | B02C 18/18 144/241 |
| 2009/0296517 A1 * | 12/2009 | Tamminga | B01F 7/241 366/314 |
| 2010/0108794 A1 * | 5/2010 | Tamminga | A01K 5/004 241/260.1 |
| 2011/0147504 A1 * | 6/2011 | Lipowski | B02C 18/14 241/30 |
| 2013/0233145 A1 | 9/2013 | Sotelo et al. | |

* cited by examiner

REVERSIBLE CUTTING EDGE FOR AGRICULTURAL CUTTER

STATEMENT REGARDING FEDERALLY SPONSORED RESEARCH OR DEVELOPMENT

--

CROSS REFERENCE TO RELATED APPLICATION

--

BACKGROUND OF THE INVENTION

The present invention relates generally to machines for preparing feed for ruminant farm animals and the like and in particular to a reversible cutting edge for such that provides improved serviceability.

Preparing feed for large animals such as dairy cows can be done through the use of an agricultural mixer, for example, providing a large hopper with a vertically extending augur that rotates to mix feed materials introduced into the hopper. The edge of the augur may support multiple cutting edges having serrated edges that catch and cut fibrous materials such as hay and silage during the mixing process.

The cutting edges are subject to damage and accordingly it is known to allow replacement of the entire cutting edges which may be unbolted directly from the auger for replacement or which may be unbolted from a holder plate which attached to the augur. In this latter case, the holder plate may include a pocket serving to support the cutting edge blade against the holder plate and to further restrain the cutting edge against left, right and rearward motion. The pocket serves to block movement of the cutting edge blade in each of four different directions to reduce or eliminate shear forces on the bolts that pass through the holder plate and cutting edge attaching them together.

As a general practice, the agricultural mixer may be mounted to a cart or wagon to be moved to different locations of silage or animals being fed. In these locations, unexpected damage to or wear of the blades can be difficult to correct if replacement blades are not brought along or were not previously ordered. Extra blades are inevitably subject to being misplaced or lost.

SUMMARY OF THE INVENTION

The present invention provides a replaceable cutting edge that may be reversed to bring fresh teeth into exposure to the feed materials allowing field repair without the need for new parts. Each cutting edge carries with it its own replacement to reduce the problem of misplacing or failing to bring cutting edge blades into the field. The cost to replace worn cutting edges is decreased by the ability to use the cutting edges twice, and the ordering of cutting edge edges is simplified by decreasing the number of new blades required.

In one embodiment the invention provides an auger cutter for crop materials having a cutting edge plate presenting opposed broad faces bounded by plate edges. The cutting edge plate has a first and second rank of cutting teeth extending from opposed plate edges of the cutting edge plate along a plane of the broad faces of the cutting edge plate. Mounting holes are provided in the cutting edge plate so that it can be attached with respect to an auger flute to draw a first rank of cutting teeth across crop materials with rotation of the auger and to shield the second rank of cutting teeth by a body of the cutting edge plate with rotation of the auger.

It is thus a feature of at least one embodiment of the invention to simplify the service of auger cutters in the field and to reduce the cost of these cutters.

The first and second rank of cutting teeth maybe rotationally symmetrical at 180 degrees of rotation at a perpendicular to the plane of the broad faces.

It is thus a feature of at least one embodiment of the invention to flexibly accommodate a variety of cutting teeth shapes provided they are rotationally symmetric.

The mounting points may include a pivot hole and a set of angular fixation holes arranged along a common radius from the pivot hole so that at least two bolts may fit respectively within the pivot hole and one of the angular fixation holes to provide an angular positioning of the mounting plate with respect to an auger flute dependent on a selection of an angular fixation hole to receive a bolt.

It is thus a feature of at least one embodiment of the invention to provide a cutting blade that can be affixed to an auger in a variety of different extension orientations.

The mounting points may be rotationally symmetrical at 180 degrees about an axis perpendicular to the plane.

It is thus a feature of at least one embodiment of the invention to preserve the ability to adjust extension orientation when the cutting blade is rotated to expose a fresh set of teeth.

The first and second rank of cutting teeth may each form a chevron whose apex extends outwardly from the cutting edge plate within the plane.

It is thus a feature of at least one embodiment of the invention to provide a cutting surface that promotes improved cutting by presenting multiple extension angles while preserving the reversibility to extend cutting edge life.

The cutting teeth may each provide a leading edge and a trailing edge, and the cutting teeth cooperate with the mounting holes so that the leading edges of the teeth are oriented to face material passing longitudinally across the cutting teeth away from an axis of rotation of the auger as the cutting edge is mounted, and the leading edges of the teeth are longer and present a face that extends at an acute angle with respect to the plane.

It is thus a feature of at least one embodiment of the invention to provide reversibility in a cutting edge plate that exhibits a direction of cutting/sawing action.

A broad face of the cutting edge plate adjacent to the leading edge of the teeth may include a cladding material of increased hardness over that of a main body of the cutting edge plate.

It is thus a feature of the present invention to provide a self-sharpening feature further extending the life of the cutting teeth.

One embodiment may further include a mounting plate attachable to the cutting edge plate using the mounting points of the cutting edge plate, the mounting plate providing auger mounting points adapted to affix a broad surface of the mounting plate to an auger flute, the mounting plate including a ledge surface extending outward with respect to the plane to abut a rearwardly positioned one of the first and second ranks of teeth to support the cutting edge plate against forces of cutting directed along the plane.

It is thus a feature of at least one embodiment of the invention to reduce the material that needs to be replaced to refresh the cutting edge by separating mounting and cutting functions.

The mounting plate may be constructed of a softer material than surfaces of the first and second ranks of teeth.

It is thus a feature of at least one embodiment of the invention to provide shear force protection to the bolts holding the cutting edge to the mounting plate by abutting the unused teeth against a ledge without damage to those teeth. It is another object of the invention to eliminate the need for a pocket to hold the cutting edge by promoting lateral resistance to the engagement of teeth and a softer metal surface.

The cutting edge plate may provide a first and second separable portion, and the ledge supports a rearwardly positioned one of the first and second ranks of teeth of each of the first and second portions of the cutting edge plate.

It is thus a feature of at least one embodiment of the invention to permit separate reversibility of portions of the cutting edge to accommodate uneven wear or localized damage at reduced cost.

The first and second portions of the cutting edge plate may be identical.

It is thus a feature of at least one embodiment of the invention to eliminate the need to buy more stock to separate cutting edge portions and/or to allow rotation of the cutting edges in the event of uneven wear as a function of an extension from the auger.

These particular objects and advantages may apply to only some embodiments falling within the claims and thus do not define the scope of the invention.

DETAILED DESCRIPTION OF THE PREFERRED EMBODIMENT

Figure 1:
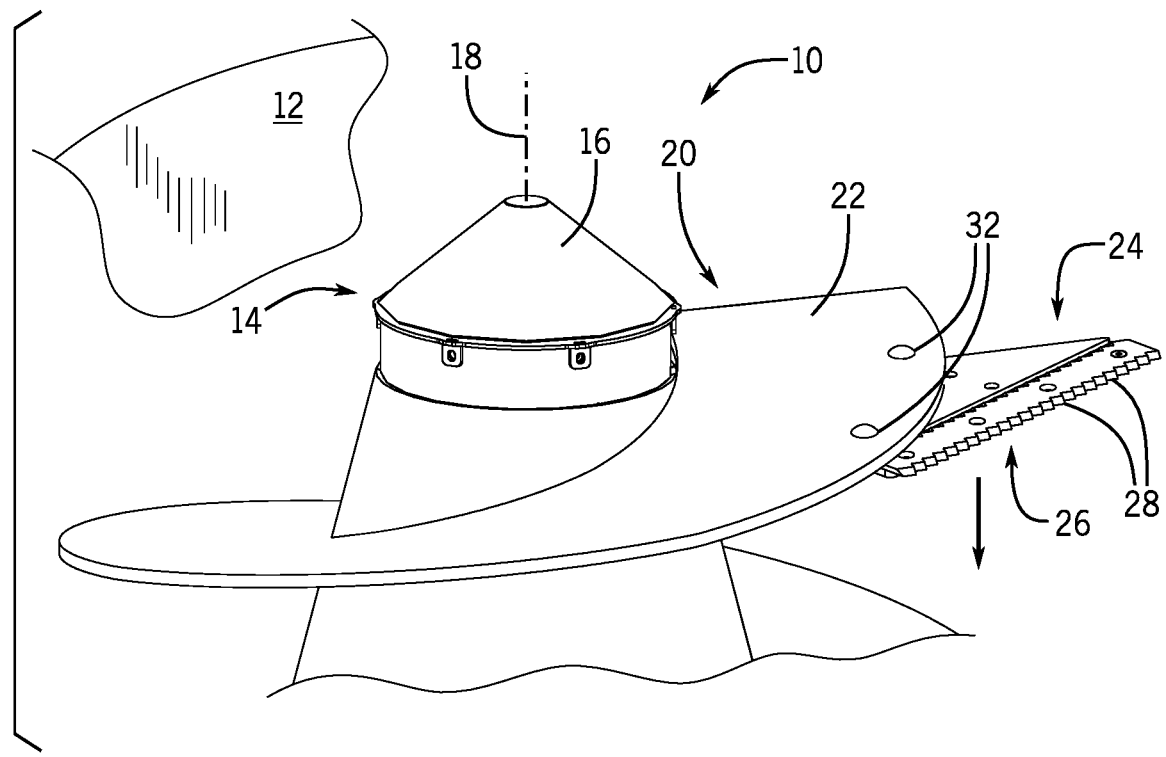
FIG. 1 is a perspective fragmentary view of a mixer augur and hopper showing an auger cutter attached to a flute of the augur.

Referring now to FIG. 1, a mixer 10 may provide for a hopper 12 for receiving feed materials through an upper opening. An augur 14 may be positioned within the hopper 12 and provide an augur shaft 16 rotating about a vertical axis 18. The auger shaft 16 may be attached to a helical flute 20 providing a flute vane 22 extending radially about the axis 18 about the auger shaft 16. Generally, the augur 14 rotates so that the flute 20 draws materials up from the bottom of the hopper 12 with rotation.

Multiple augur cutters 24 may be attached to the outer edge of the flute vane 22 (only one shown) at multiple locations along the flute 20. Each auger cutter 24 extends generally horizontally from the outer edge of the flute vane 22 to expose a front edge 26 oriented with respect to rotation of the augur 14 so that the rank of cutting teeth 28 on the front edge 26 will be drawn across feed materials held within the hopper 12 during mixing.

Figure 2:
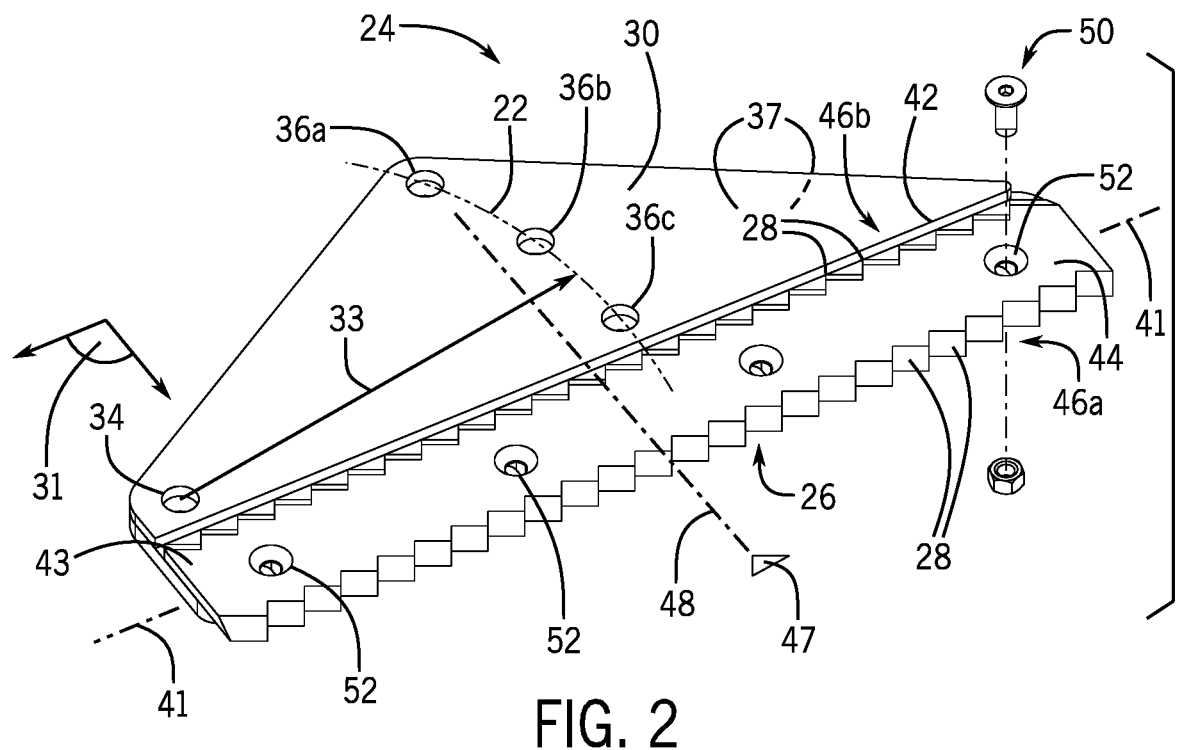
FIG. 2 is a perspective view of the auger cutter of FIG. 1 comprising a holder plate supporting a reversible cutting edge having opposed ranks of teeth.

Referring also to FIG. 2, each augur cutter 24 may provide for a support plate 30 attached to the flute vane 22 (as depicted in FIG. 1), for example, by two carriage bolts 32 passing downward through the flute vane 22 to be received by corresponding holes in the support plate 30. Specifically, the threaded shafts of two bolts 32 may be received respectively in a pivot hole 34 and one of multiple angular fixation holes 36a-c each passing through broad faces 37 of the support plate 30 and generally perpendicular to a plane 31 parallel to the broad faces 37 along which the support plate 30 extends.

The pivot hole 34 may be located at an edge of the support plate 30 near a front edge 26 of the auger cutter 24 and proximate to the flute vane 22 as attached. The angular fixation holes 36a-c may be located toward a center of the support plate 30 at varying distances from the front edge 26 of the support plate 30, each angular fixation hole 36 angularly separated and positioned along a common radius 33 about the pivot hole 34. By selecting a particular angular fixation hole 36 to attach the augur cutter 24 to the vane 22, an angle of the front edge 26 with respect to a line of radius from axis 18 can be varied changing the aggressiveness of the auger cutter 24.

Figure 3:
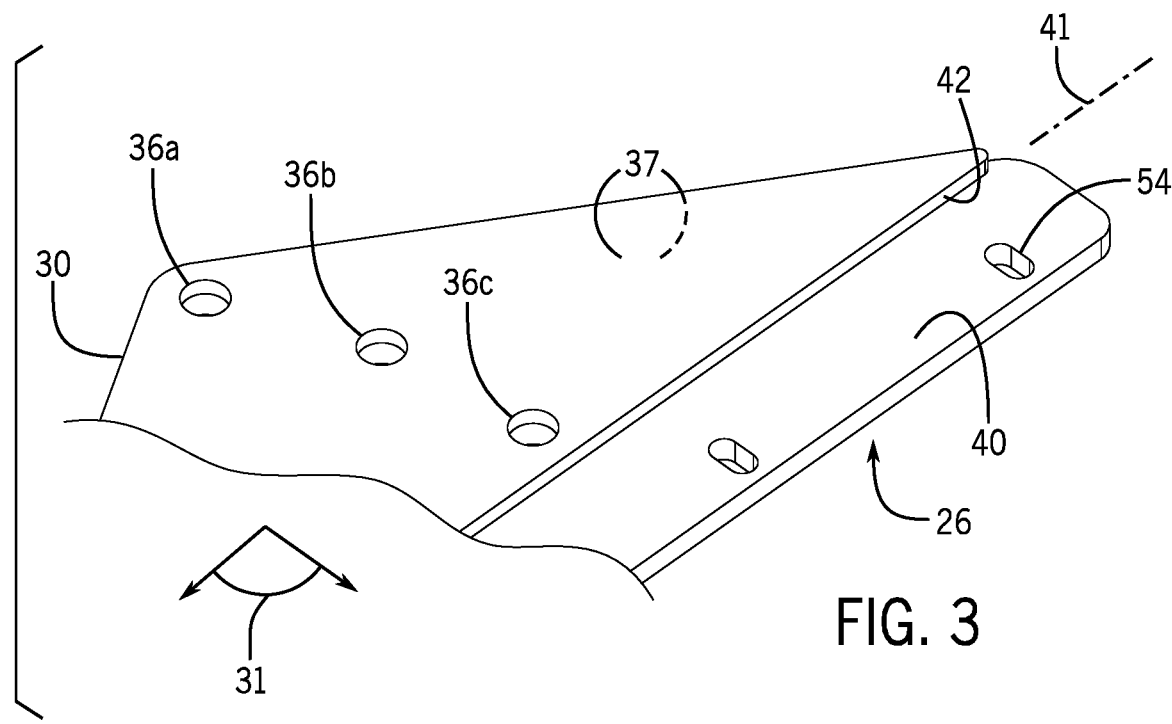
FIG. 3 is a fragmentary perspective view of the holder plate without the cutting edge showing slotted mounting holes for allowing worn teeth of the cutting edge to abut a supporting ledge to remove strain from bolts attaching the cutting edge to the holder plate.

Referring now also to FIG. 3, the front edge 26 of the support plate 30 may provide a shelf 40 presenting a generally horizontal supporting surface parallel to the broad faces 37 of the support plate 30 but recessed below the upper broad face 37. In this way, a rear edge of the shelf 40 abuts a ledge 42 rising upward therefrom extending along a longitudinal axis 41 at the rear edge of the shelf 40 to be generally parallel to the front edge 26.

As shown in FIG. 2, a cutting edge plate 44 having a longitudinal dimension approximately equal to that of the shelf 40 may be positioned on the shelf 40 so that its upper broad face 43 is substantially flush with the broad face 37 of the support plate 30 and a lower broad face 43' (not shown) abuts the upper surface of the shelf 40. The cutting edge plate 44 provides for the cutting teeth 28 arrayed along a first tooth rank 46a that extend in cantilevered fashion forward over a front edge the support plate 30 0 to be exposed at the front edge 26 of the augur cutter 24 as depicted in FIG. 1.

During rotation of the augur 14, the cutting teeth 28 of the first tooth rank 46a will contact material to be cut as brought into contact with the cutting teeth 28 by that rotation. The cutting edge plate 44 also provides a second rank 46b of cutting teeth 28 on an opposite edge of the cutting edge plate 44 from the first rank 46a that may abut the ledge 42. As so positioned, force 48 received by the cutting edge plate 44 along a perpendicular 48 to the ledge 42, caused by the cutting action, is transmitted through the ledge 42 to the support plate 30 and hence to the flute vane 22. In this way, the cutting edge plate 44 may be attached to the support plate 30 by bolts 50 passing through a corresponding hole 52 in the cutting edge plate 44 and corresponding slots 54 in the shelf 40 of the support plate 30 generally perpendicularly to the plane 31 without sheer damage to those bolts 50 such as may damage their threads or the like.

The bolts 50 may have flat heads to be received within counter sinking on the holes 52 to provide contact surfaces outside of the threads of the bolts 50 further reducing damage to the threads.

Notably this arrangement of having the second rank 46b of teeth engaging the ledge 42 and the countersinking of the bolts 50 eliminates the need to define a pocket in the support plate 30 for retaining the cutting edge plate 44.

The slotted holes 54 in the support plate 30 allow the cutting edge plate 44 to be adjusted rearwardly to ensure that there is always positive engagement between the cutting teeth 28 and the ledge 42 even after the cutting edge plate 44 is reversed (as will be described below) so that worn teeth 28 are adjacent to the ledge 42. In one embodiment the cutting edge plate 44 may provide for equally spaced holes 52 extending along the longitudinal axis 41 to attach with corresponding bolts to corresponding slots 54 in the shelf 40 of the support plate 30.

The ledge 42 and shelf 40 may be readily constructed by assembling the support plate 30 from two different plates of material stacked on top of each other with the edge of the upper plates forming the ledge 42 and the lower plate forming the shelf 40. Generally the material of the ledge 42 will be softer than the material forming the outer surface of the teeth 28, for example, and un-hardened steel, to prevent damage to the unused teeth 28.

Figure 4:
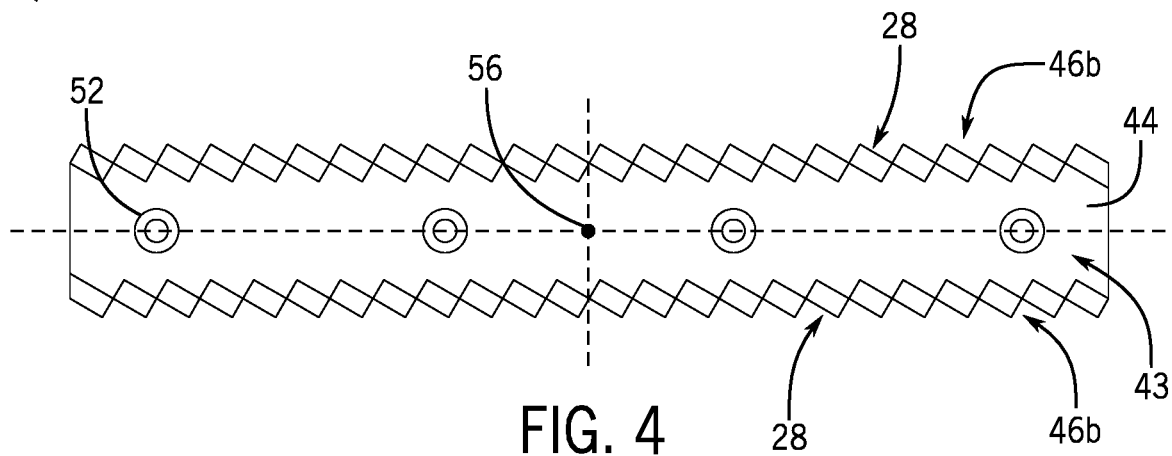
FIG. 4 is a top plan view of a first embodiment of one cutting edge providing for two different opposed ranks of cutting teeth on a single blade.

Referring now to FIG. 4, generally the ranks 46a and 46b of cutting teeth 28 on the cutting edge plate 44 will be positioned on the cutting edge plate 44 to be rotationally symmetric at 180 degrees about a center point 56 of the cutting edge plate 44. In this way, rotation of the cutting edge plate 44 about a perpendicular to its upper face through the center point 56 by 180 degrees allows the cutting edge plate 44 to be re-attached to the support plate 30 to provide essentially the same cutting surface at the front edge 26 of the augur cutter 24. The holes 52 need not be rotationally symmetric at 180 degrees; however, such symmetry will eliminate the need for extra hole drilling.

Figure 5:
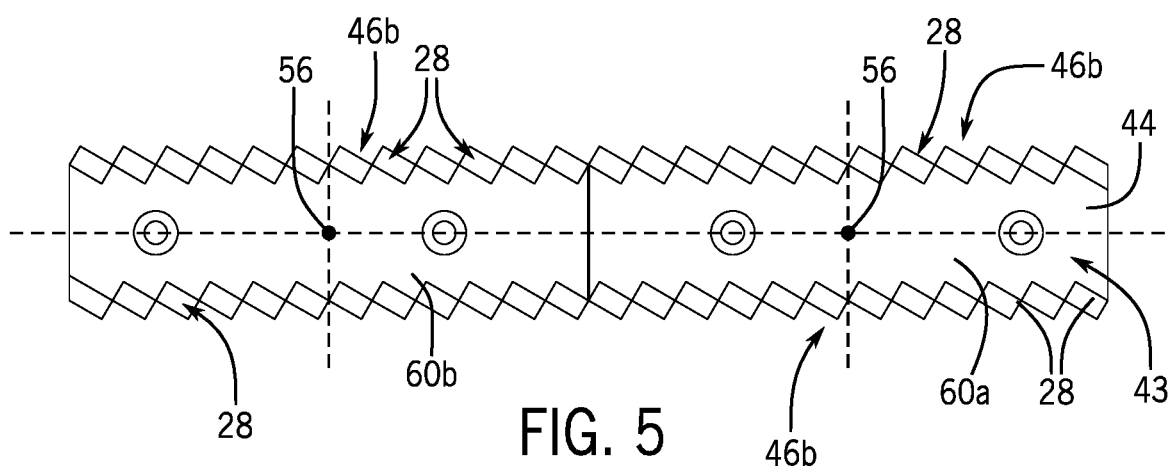
FIG. 5 is a figure similar to that of FIG. 4 showing two cutting edge portions each providing opposed ranks of teeth providing additional options for repair.

Referring now to FIG. 5, in an alternative embodiment the cutting edge plate 44 may be composed of plate portions 60a and 60b essentially dividing the cutting edge plate 44 of FIG. 4 into identical halves along its longitudinal length. Each of the plate portions 60a and 60b will provide rotational symmetry at 180 degrees with respect to its cutting teeth 28 of ranks 46a and 46b about a respective centerpoint 56a and 56b. In this way, if a few teeth 28 are damaged or prematurely worn, that individual plate portion 60 may be rotated providing additional repair options in the field. In this case, each plate portion 60a and 60b may provide for at least two holes received by corresponding slots 54 in the support plate 30 (shown in FIG. 3). It will be appreciated that the left plate portion 60a and right plate portion 60b are also interchangeable allowing, for example, the ability to rotate the positions of the plate portion 60 if there is uneven wear along the longitudinal extent of the cutting edge plate 44.

Figure 6:
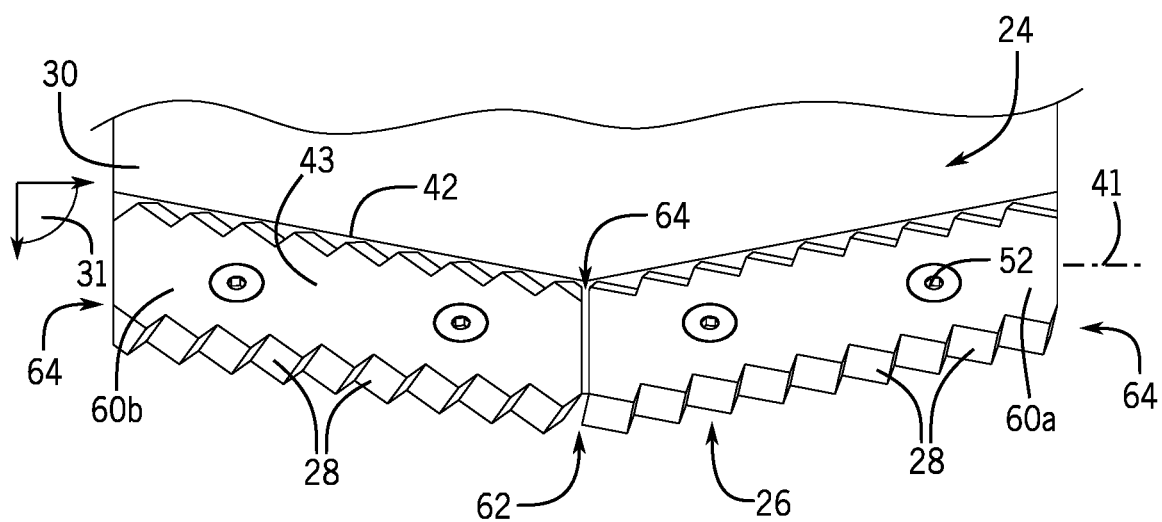
FIG. 6 is a fragmentary perspective view similar to that of FIG. 2 showing the cutting edges arranged in an outwardly extending chevron formation with aligned teeth leading edges.

Referring now to FIG. 6, in one embodiment the cutting teeth 28 at the front edge 26 of the augur cutter 24 follow the form of a forwardly extending chevron having a forward most apex 62 on either side of which the cutting teeth 28 sweep backward as one moves away from the apex 62 along the longitudinal axis 18. A single cutting edge plate 44 may be created in the chevron shape or alternatively the chevron shape may be realized by separate plate portions 60a and 60b as shown, each conforming to a parallelogram, in this embodiment, to provide for the desired rotational symmetry of the cutting teeth 28 while allowing the longitudinally opposed ends 64 of the plate portions 60a and 60b to fit together in the chevron shape at different rotations. In this case, the plate portions 60a and 60b may be interchangeable; however, the invention also contemplates that the teeth 28 may have a leading and trailing edge that differ, as discussed below, in which case the plate portions 60a and 60b will not be interchangeable without additional rotation by 180 degrees about the longitudinal axis.

In all cases of the chevron form, the ledge 42 conforms to the chevron shaped to provide support for the cutting teeth 28 that are not at the front edge 26.

Figure 7:
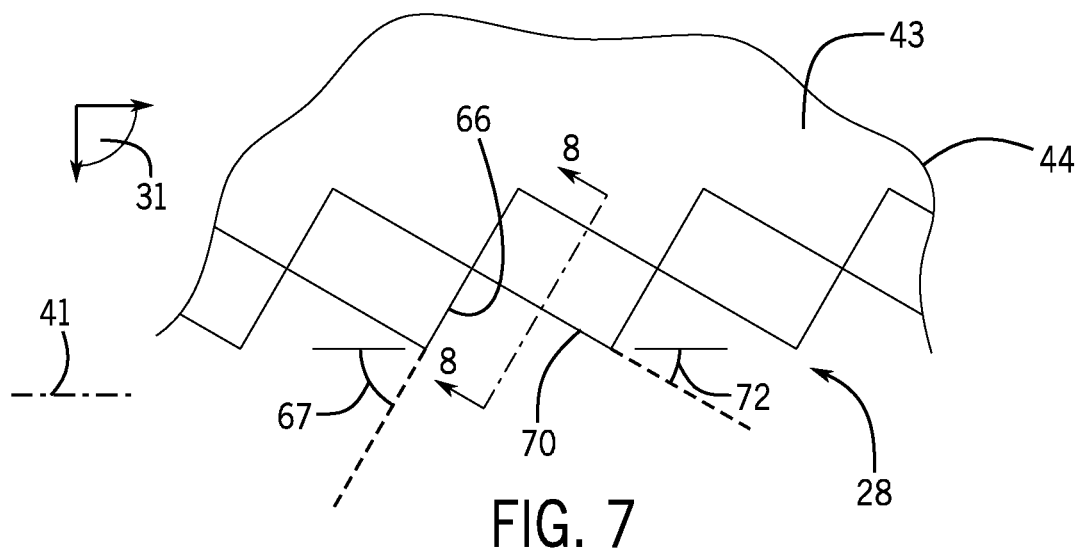
FIG. 7 is a top plan detail view of the teeth of each of FIGS. 2, 4, 5, and 6, showing the leading and trailing edges of each tooth where the leading edges present a beveled, sharpened surface.

Referring now to FIG. 7, as noted above, each of the cutting teeth 28 are generally triangular and may have a trailing edge 66 and a leading edge 70. The trailing edge extends along a plane having one plane axis that is generally perpendicular to the broad face 43 and one plane axis, perpendicular to the first plane axis, having a trailing angle 68 measured along the plane 31. Similarly, the leading edge 70 extends in a plane having a first plane axis at a bevel angle 77 with respect to the broad face 43 (shown in FIG. 8) and a second, perpendicular plane axis measured along the plane 31 having a leading angle 72. In one embodiment, the trailing angle 68 is perpendicular to the leading angle 72. Generally trailing angle 68 provides an included angle with respect to the longitudinal axis 41 that is larger than the included angle of the leading angle 72.

The teeth 28 may be cut so that the leading edges 70 of each of the teeth in all of these embodiments will be oriented to face inward toward the flute 20 when the augur cutter 24 is attached to the augur 14. In this way, silage material sliding along the teeth 28 in a radially outward direction from the axis 18 will confront the sharper leading edges 70.

Figure 8:
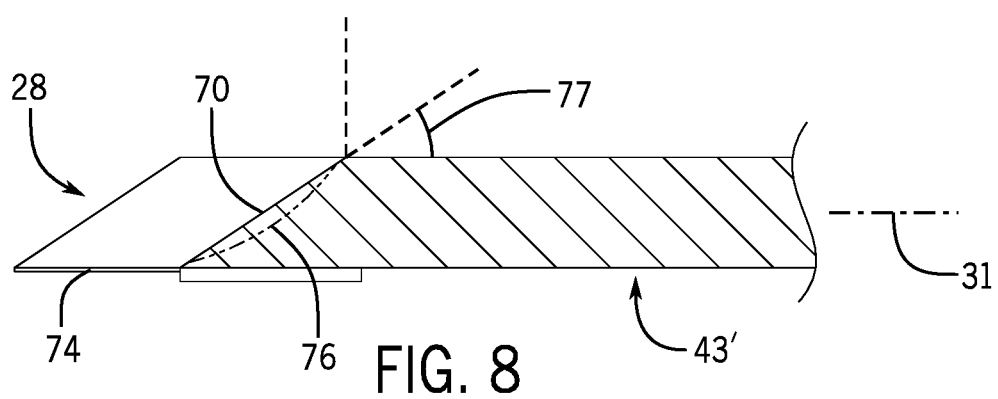
FIG. 8 is a cross-sectional view along line 8-8 of FIG. 7 showing a beveling of the leading edges and a cladding material to provide a self-sharpening feature.

Referring now to FIG. 8, a cladding material 74 may be placed on the planar lower broad face 43' of the cutting teeth 28, this cladding having a higher wear resistance and higher hardness. In this way, erosion of the surface of the teeth 28 indicated by dotted line 76 with use of the augur cutter 24 will tend to provide a self-sharpening effect by preferentially wearing the softer upper material backward into a sharper configuration from the cladding material 74, the latter of which exhibits reduced where. All surfaces of the teeth 28 may be further hardened, for example, by a case hardening or similar treatment techniques.

Figure 9:
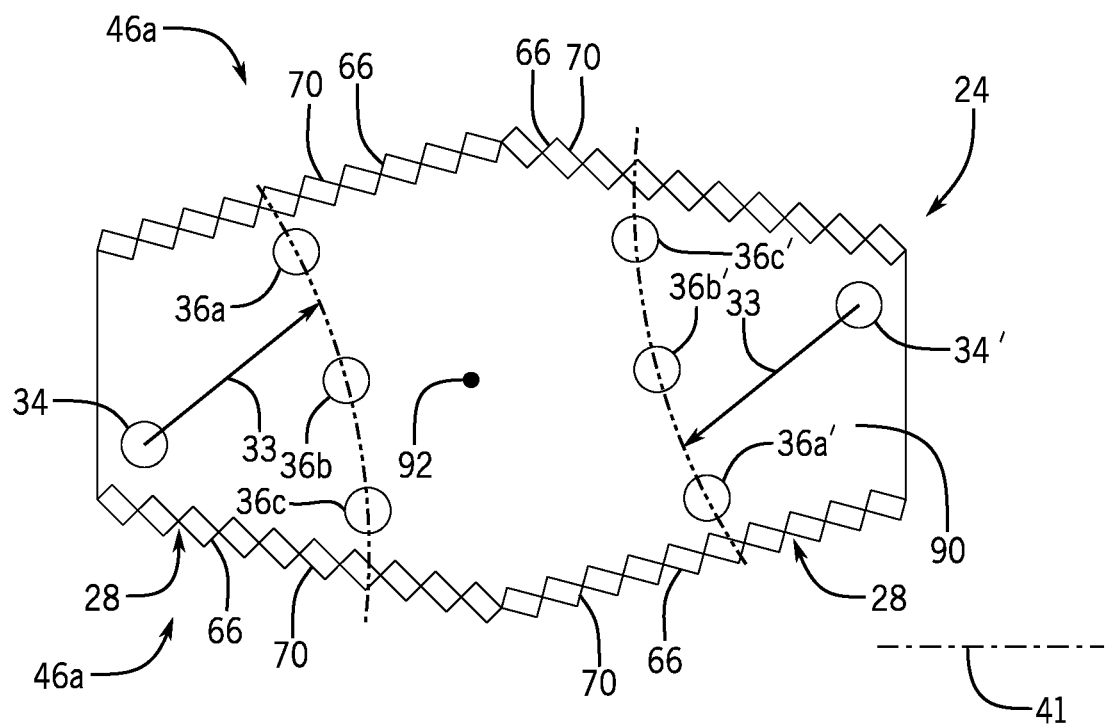
FIG. 9 is an alternative embodiment of the cutter eliminating the need for a separate support plate.

Referring now to FIG. 9, in one embodiment the augur cutter 24 may provide an integrated support plate 30 and cutting edge plate 44 formed from a single metal plate 90. As with the other designs, this plate 90 may be rotationally symmetric at 180 degrees about a center point 92 perpendicular to the broad faces of the metal plate 90. In this case the rotational symmetry may be not only with respect to the cutting teeth 28 on opposed ranks 46a and 46b on opposite edges of the plate 90 but also with respect to pivot holes 34 and 34' and angular holes 36a-c and 36'a-c. As before, the cutting edges 70 of the teeth 28 may be oriented to face silage or other material sweeping longitudinally along a longitudinal axis 41 across a rank 46 radially away from the auger axis 18.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A cutter system for crop materials comprising:
   a support plate providing a shelf extending along a cutting plane and having a ledge at a rear of the shelf extending upward from the shelf, the shelf further including mounting holes;
   a cutting edge plate having opposed broad faces bounded by a first and second rank of cutting teeth extending from opposed plate edges of the cutting edge plate the cutting edge plate further including mounting holes to attach the cutting edge plate to the shelf with the second rank of cutting teeth abutting the ledge;
   wherein the ledge is constructed of a material that is softer than surfaces of the first and second ranks of cutting teeth;
   wherein the first and second rank of cutting teeth are rotationally symmetrical at 180 degrees of rotation about a perpendicular to the broad faces of the cutting edge plate; and
   wherein the cutting teeth of the first and second ranks of cutting teeth are asymmetric to have cutting edges facing one direction.

2. The cutter system of claim 1 wherein the support plate further has mounting holes outside of the ledge including a pivot hole and a set of angular fixation holes arranged along a common radius from the pivot hole so that at least two bolts may fit respectively within the pivot hole and one of the angular fixation holes to provide an angular positioning of the support plate with respect to an auger flute dependent on a selection of an angular fixation hole to receive a bolt.

3. The cutter system of claim 2 further having a first and second set of pivot holes and corresponding angular fixation holes arranged along a common radius from respective pivot holes and wherein the sets are rotationally symmetrical at 180 degrees about an axis perpendicular to a plane parallel the the broad faces of the cutting edge plate when the cutter edge plate is mounted on the shelf.

4. The cutter system of claim 1 wherein the first and second rank of cutting teeth each form a chevron whose apex extends outwardly from the cutting edge plate within a plane parallel to the broad faces of the cutting edge plate.

5. The cutter system of claim 1 Wherein the cutting teeth each provide a leading edge and a trailing edge and wherein the leading edges of the cutting teeth are longer than the trailing edges and present a face that extends at an acute angle with respect to a plane parallel to the broad faces of the cutting edge plate.

6. The cutter system of claim 1 wherein one of the broad faces of the cutting edge plate at a location adjacent to the leading edges of the cutting teeth includes a cladding material of increased hardness over that of a main body of the cutting edge plate.

7. An agricultural mixer for crop materials comprising:
   a hopper;
   an auger rotatable about an axis within the hopper;
   a set of cutter systems affixed to the auger to extend outward therefrom to receive and cut crop materials within the hopper, each cutter system providing:
   a support plate providing a shelf extending along a cutting plane and having a ledge at a rear of the shelf extending upward from the shelf, the shelf further including mounting holes;
   a cutting edge plate having opposed broad faces bounded by a first and second rank of cutting teeth extending from opposed plate edges of the cutting edge plate the cutting edge plate further including mounting holes to attach the cutting edge plate to the shelf with the second rank of cutting teeth abutting the ledge;
   wherein the ledge is constructed of a material that is softer than surfaces of the first and second ranks of cutting teeth;
   wherein the first and second ranks of cutting teeth are rotationally symmetrical at 180 degrees of rotation about a perpendicular to the plane of the broad faces of the cutting edge plate; and
   wherein cutting teeth of the first and second rank of cutting teeth are asymmetric to have cutting edges facing one direction.

* * * * *